(12) United States Patent
Cheng

(10) Patent No.: US 6,644,011 B2
(45) Date of Patent: Nov. 11, 2003

(54) ADVANCED CHENG COMBINED CYCLE

(75) Inventor: Dah Yu Cheng, Los Altos Hills, CA (US)

(73) Assignee: Cheng Power Systems, Inc., Mountain View, CA (US)

( * ) Notice: Subject to any disclaimer, the term of this patent is extended or adjusted under 35 U.S.C. 154(b) by 0 days.

(21) Appl. No.: 09/816,588

(22) Filed: Mar. 23, 2001

(65) Prior Publication Data

US 2001/0039797 A1 Nov. 15, 2001

Related U.S. Application Data

(60) Provisional application No. 60/191,599, filed on Mar. 24, 2000.

(51) Int. Cl.[7] .................................................. F02C 6/18
(52) U.S. Cl. .................... 60/39.182; 60/39.55; 60/806
(58) Field of Search ................... 60/39.182, 39.55, 60/806, 39.5, 775; 290/52

(56) References Cited

U.S. PATENT DOCUMENTS

| | | | |
|---|---|---|---|
| 4,069,424 A | * 1/1978 | Burkett | 290/52 |
| 4,519,207 A | * 5/1985 | Okabe et al. | 60/39.182 |
| 4,907,406 A | * 3/1990 | Kirikami et al. | 60/39.182 |
| 5,370,772 A | * 12/1994 | Arpalahti et al. | 60/39.182 |
| 5,613,356 A | * 3/1997 | Frutschi | 60/39.182 |
| 6,256,978 B1 | * 7/2001 | Gericke et al. | 60/39.182 |

* cited by examiner

Primary Examiner—Michael Koczo
(74) Attorney, Agent, or Firm—Cooper & Dunham LLP

(57) ABSTRACT

An Advanced Cheng Combined Cycle engine is a combination of the Cheng Cycle or the Advanced Cheng Cycle and a combined cycle, and serves to further enhance the power generation capability of either the Cheng Cycle, the Advanced Cheng Cycle, or the combined cycle alone. A gas turbine is provided, having a turbine generating power, a compressor receiving power from the turbine, and a combustion chamber to which is input compressed air from the compressor along with fuel and combustion products for producing energy to drive the turbine, the gas turbine producing a hot stream gas. A heat recovery steam generator receives hot stream gas produced by the gas turbine and generates high-pressure steam therefrom. A steam turbine receives and is driven by high-pressure steam generated by the heat recovery steam generator. The steam turbine bleeds intermediate-pressure steam for cooling the turbine and for injection back into the combustion chamber of the gas turbine. A control valve throttles down high-pressure steam generated by the heat recovery steam generator to a low-pressure steam for injection back into the combustion chamber of the gas turbine.

1 Claim, 4 Drawing Sheets

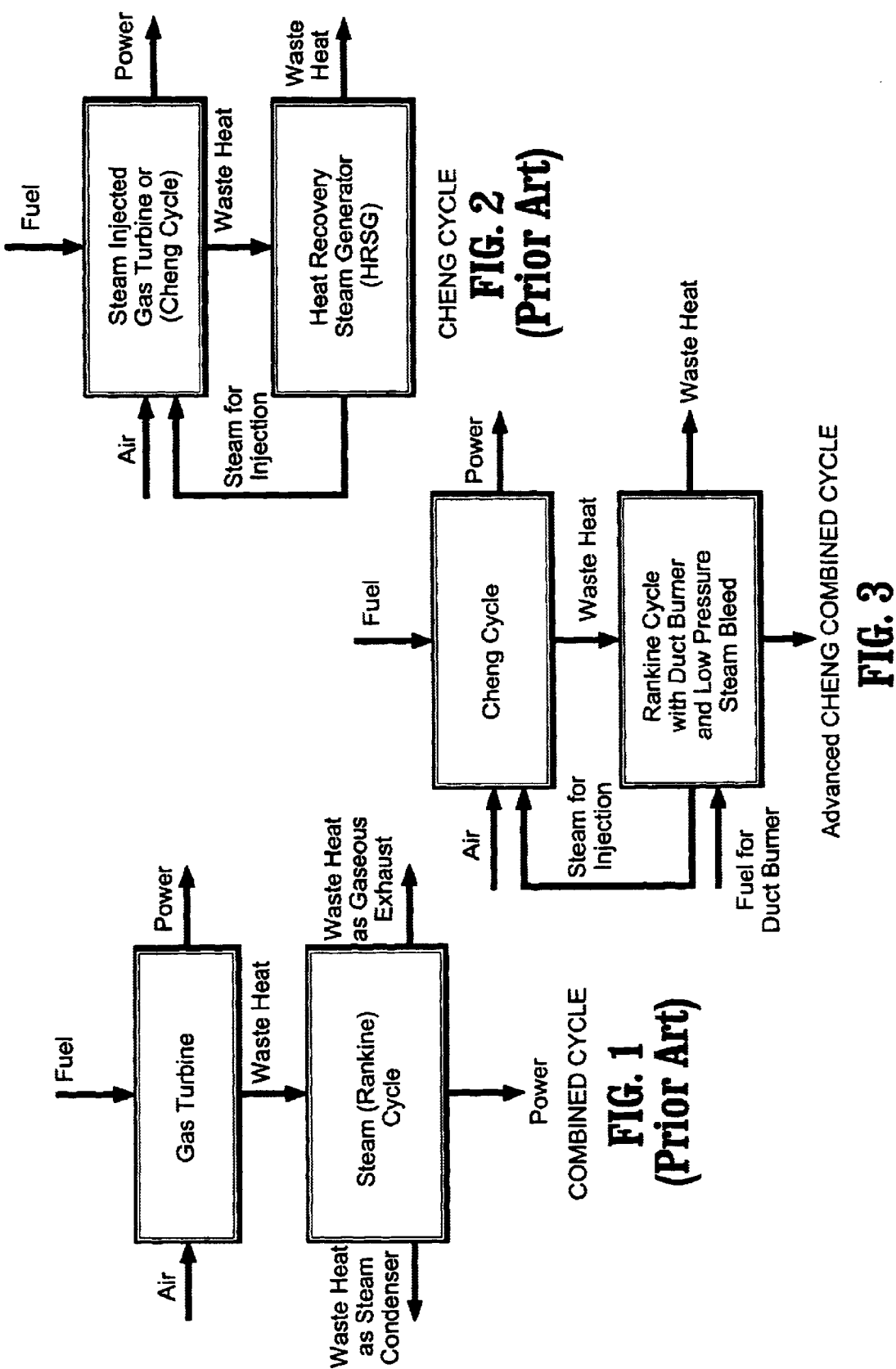

DUCT BURNER
LOW NOx
BURNER SYSTEM

ADVANCED CHENG COMBINED CYCLE

REFERENCE TO RELATED APPLICATION

This present application claims the benefit of provisional Application Serial No. 60/191,599 filed on Mar. 24, 2000, which is hereby incorporated by reference.

FIELD

This patent specification relates to the field of heat engines, and more particularly, to an Advanced Cheng Combined Cycle engine that combines features of the combined cycle and the Cheng Cycle or the Advanced Cheng Cycle.

BACKGROUND

A heat engine is a device that converts heat to work for the purpose of supplying power. There are many different applications of heat engines, ranging from small transportable engines to very large stationary engines. Typical applications include engines for automobiles, ships, aircrafts, and power plants. In steam, gas, or hydroelectric power plants, the device that drives the electric generator is the turbine. As the fluid passes through the turbine, work is done against the blades which are attached to the shaft. As a result, the shaft rotates, and the turbine produces work.

A gas turbine engine is a heat engine that is operated by a gas or liquid fuel rather than being operated, for example, by steam or water. The two major application areas of gas turbine engines are aircraft propulsion and electric power generation. When used for aircraft propulsion, the gas turbine produces just enough power to drive the compressor and to drive a small generator to power the auxiliary equipment. The high-velocity exhaust gases are responsible for producing the necessary thrust to propel the aircraft.

In the application area of electric power generators, gas turbines are used as stationary power plants to generate electricity. Gas turbine power plants are mostly utilized in the power generation industry to cover emergencies and peak periods, because of their relatively low cost and quick response time. With the deregulation of public utilities, systems must attain peaking power during working hours to follow the load profile of electrical consumption.

Three well-known cycles for heat engines relating to gas turbines are the combined cycle, the Cheng cycle, and the Advanced Cheng cycle. FIG. 1 is a block diagram of a typical combined cycle. The combined cycle is a combination of a gas turbine cycle (known in the art as a "Brayton" cycle) and a steam turbine cycle (known in the art as a "Rankine" cycle) in series.

The waste heat from the gas turbine cycle is used to boil the water in the separate steam cycle. A working fluid is a fluid to and from which beat is transferred while undergoing a cycle. The combined cycle has separate loops for two working fluids with two separate and distinct power turbines. The two working fluids are not mixed, unlike in the Cheng cycle as will be explained below. Although steam generated from the exhaust waste heat of a gas turbine powers the combined cycle, very high pressure at a low temperature is used to economically drive a conventional steam turbine and its associated accessories.

The combined cycle may include a single gas turbine or multiple gas turbines. Exhaust from the gas turbines is directed into a Heat Recovery Steam Generator (HRSG), which produces an intermediate amount of pressurized steam (greater than 1000 pounds per square inch absolute or psia) at a temperature greater than 750 degrees Fahrenheit (F), which is used to drive the steam turbine. The steam is then condensed by a condenser and recycled back into the boiler. Heat is rejected from the condenser by means of a cooling mechanism, usually a cooling tower.

Both the Cheng Cycle and the Advanced Cheng Cycle were conceived by the Applicant of the present invention in the 1970s, and one or both have been the subject of a number of prior art patents, including U.S. Pat. Nos. 3,978,661, 4,128,994, 4,248,039, 4,297,841, 4,417,438, and 5,233,826, which are hereby incorporated by reference.

The Cheng Cycle engine is a dual-fluid engine which makes use of two separate working fluids. Each fluid is compressed separately, but they are combined in a single mixture for expansion and heat regeneration. This cycle essentially combines a Brayton cycle and regenerative Rankine cycle system in parallel such that operational limitations of compression ratio in the Brayton cycle, upper temperature in the Rankine cycle, and waste heat rejection in both cycles are removed or reduced. An important feature of this cycle is regeneration using the Rankine cycle working fluid.

FIG. 2 is a block diagram of the Cheng Cycle, which, like the combined cycle, comprises a gas turbine. A heat recovery steam generator (HRSG) also recovers the Cheng Cycle's exhaust waste heat, but usually at a lower pressure (under 1000 psia) and at a much higher steam temperature. The generated steam is then injected back into the gas turbine through a combustion chamber, which has downstream turbine stages that include both power augmentation for the turbine and cooling for the high temperature components. After undergoing these processes, the gas turbine exhaust comprises both air and steam. This additional steam will allow the Heat Recovery Steam Generator (HRSG) to generate more steam than normal gas turbine waste heat can produce alone.

FIG. 6 illustrates the components associated with an embodiment of the Cheng Cycle. The gas turbine has a compressor 10 linked to a turbine 13 by shaft and output to a load. The air intake through compressed air port 1 is compressed and then discharged at 2. The compressed air enters a combustion chamber 12. Fuel enters the combustion chamber through port 11, and steam comes from the heat recovery steam generator (HRSG) to port 3. The mixing of the combusted air and steam reaches a predetermined turbine inlet temperature, then discharges from outlet 4 through turbine 13, exiting the turbine at outlet 5. Exhaust gas then passes through the heat recovery steam generator, which is divided into two parts: a superheater 14, and a water-to-steam generator 15. The hot exhaust gas enters the superheater 14, gives up the heat to superheat the steam entering at 8 and exiting at 3. A duct burning capability is not depicted here, but would normally be located at 6. The remainder of the heat is recovered by the unit evaporator 15 and exits at valve 17. The exhaust gas at 7 has the option of going through a cleanup or condensing unit 20, then to the atmosphere. Water can be recovered through 20 or can be totally used as a makeup entering or mixing with 19. Water is compressed to a high pressure through a pump 18. The pump exit goes into the steam generator at 9, and the evaporator controls the steam flow by two valves—16 into the superheater, and 17 into a congeneration unit (not shown).

Therefore, as can be seen from the foregoing description, the Cheng Cycle is a steam-injected gas turbine that uses steam generated by recovering the waste heat of the gas turbine. A predetermined mixture of air and steam, in an appropriate functioning ratio, defines the contour of a partial load operating line. As demonstrated in the industry, the Cheng Cycle is extremely simple to implement, with high levels of efficiency and dynamic response.

The Advanced Cheng Cycle represents an improvement over the Cheng Cycle. A difference between the Cheng Cycle and the Advanced Cheng Cycle is that in the Advanced Cheng Cycle, steam cooling is bled into the gas turbine. This process does not occur in the Cheng Cycle. At the time the Cheng Cycle was conceived, the majority of gas turbines were operating at a metallurgically tolerable turbine inlet temperature for stress and corrosion protection. The Cheng Cycle was therefore conceived at that time without consideration to cooling of the turbine blades.

Although the combined cycle and the Cheng Cycle or the Advanced Cheng Cycle provide many benefits as described above, improvements are still desirable. For example, it would be beneficial to increase the power output of the combined cycle, especially during the day in the summertime. It would also be beneficial to reduce the NOx emissions of the combined cycle. Further, it would be helpful to provide dynamic load-following capabilities so that systems may optimally attain peaking power during working hours.

SUMMARY OF THE INVENTION

One object of the disclosure herein is to increase the power output from that of a combined cycle, especially during the day in the summer time. Another is to reduce the NOx emissions typical in the combined cycle. Yet another is to provide dynamic load-following capabilities.

These and other objects are accomplished by effectively combining features of the Cheng Cycle or the Advanced Cheng Cycle with the combined cycle to form the Advanced Cheng Combined Cycle. The Advanced Cheng Combined Cycle realizes power-producing capabilities that surpass those of the combined cycle. It also exhibits characteristics that surpass the well-established baseload work characteristics of the combined cycle. Furthermore, it provides load characteristics even more flexible than the load-following characteristics of the Cheng Cycle or the Advanced Cheng Cycle.

The present specification discloses in one embodiment an Advanced Cheng Combined Cycle system. A gas turbine is provided, having a turbine generating power, a compressor receiving power from the turbine, and a combustion chamber to which is input compressed air from the compressor along with fuel and combustion products for producing energy to drive the turbine, the gas turbine producing a hot stream gas. A heat recovery Steam generator receives hot stream gas produced by the gas turbine and generates high-pressure steam therefrom. A steam turbine receives and is driven by high-pressure steam generated by the heat recovery steam generator. The steam turbine bleeds intermediate-pressure steam for cooling the turbine and for injection back into the combustion chamber of the gas turbine. A control valve throttles down high-pressure steam generated by the heat recovery steam generator to a low-pressure steam for injection back into the combustion chamber of the gas turbine.

The heat recovery steam generator may further comprise a duct burner for increasing the temperature of hot stream gas produced by the gas turbine to produce additional steam for injection back into the combustion chamber of the gas turbine.

The Advanced Cheng Combined Cycle system may further comprise an emission control system disposed between the gas turbine and the heat recovery steam generator.

In the operations of the Advanced Cheng Combined Cycle, according to the preferred embodiments, the duct burner is added to the combined cycle to generate additional steam for injection into the gas turbine. The injected steam increases the mass flow level of the gas turbine to facilitate production of additional steam. As a result, the waste heat boiler, known as the Heat Recovery Steam Generator (HRSG), is capable of producing more steam at a higher thermal efficiency level. The thermal efficiency level represents the fraction of the heat input that is converted to net work output, and therefore measures the performance or efficiency of the engine.

Because the additional steam generated by the duct burner makes the gas turbine power augmentation much more flexible than that of the combined cycle alone, the Advanced Cheng Combined Cycle can perform load-following during the day and perform baseload work in off-peak hours. The steam injection also reduces NOx emissions at an extremely low cost.

BRIEF DESCRIPTION OF THE DRAWINGS

FIG. 1 is a block diagram of a combined cycle;

FIG. 2 is a block diagram of a Cheng Cycle;

FIG. 3 is a block diagram of an Advanced Cheng Combined Cycle embodiment;

DETAILED DESCRIPTION OF PREFERRED EMBODIMENTS

FIG. 3 is a block diagram that shows an overview of an Advanced Cheng Combined Cycle embodiment. As explained above, the Advanced Cheng Combined Cycle is a combination of the Cheng Cycle or the Advanced Cheng Cycle and the combined cycle. In the Advanced Cheng Combined Cycle, high-pressure steam is generated by a heat recovery Steam generator (HRSG). This high-pressure steam is used to drive a steam turbine as part of the conventional combined cycle. The high-pressure steam can also be throttled down to a lower pressure level for injection back into the gas turbine. A portion of the low-pressure steam exhaust in the intermediate stage of the steam turbine is also used for injection back into the gas turbine of the Cheng cycle.

A typical combined cycle uses up all the waste heat to maximize the power generation capabilities and efficiency rate of the steam turbine cycle. Because the Advanced Cheng Combined Cycle's functions result in some leftover waste heat, a duct burner is added to the heat recovery steam generator (HRSG) to increase the temperature of the gas turbine exhaust, allowing the HRSG to produce additional steam for injection into the combustion chamber of the gas turbine. This steam injection increases the power output of both the gas turbine and the steam turbine cycles, and reduces NOx emissions by lowering the flame temperature.

The Advanced Cheng Combined Cycle thereby provides benefits not realized in the prior art cycles by combining strengths of the combined cycle and the Cheng Cycle or the Advanced Cheng cycle. That is, the Cheng Cycle or the Advanced Cheng Cycle has excellent load-following dynamics, as flexible as those of a simple gas turbine cycle.

In contrast, the combined cycle, due to the steam turbine's slow response, is usually only used for baseload operations. Therefore, a combination of the Cheng Cycle or the Advanced Cheng Cycle and the combined cycle as disclosed in this patent specification results in an excellent baseload efficiency rate and in a strong peaking capability. It also provides peak shaving capabilities during the day and an excellent baseload operation at night.

Figure 4:
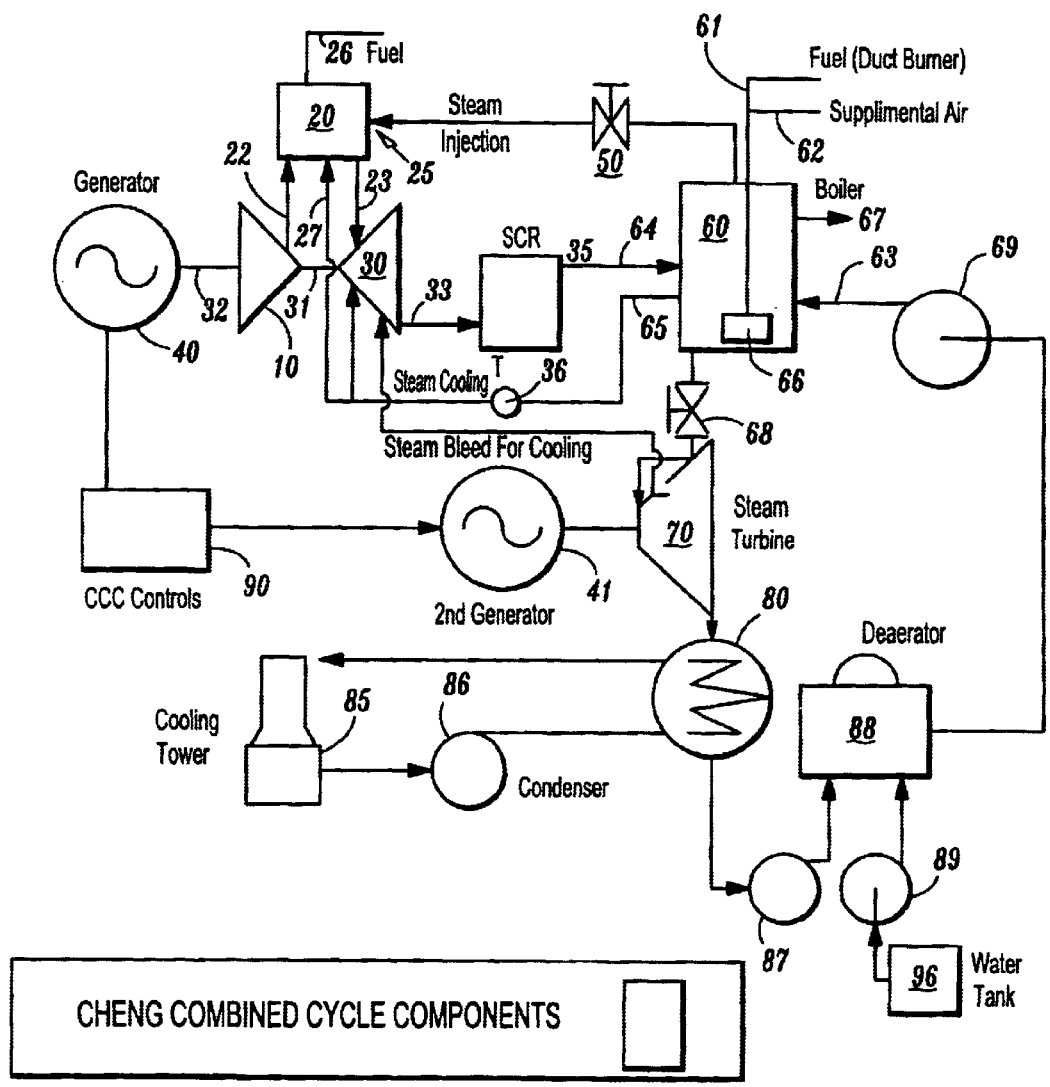
FIG. 4 is a block diagram of components of an Advanced Cheng Combined Cycle embodiment.
Figure 5:
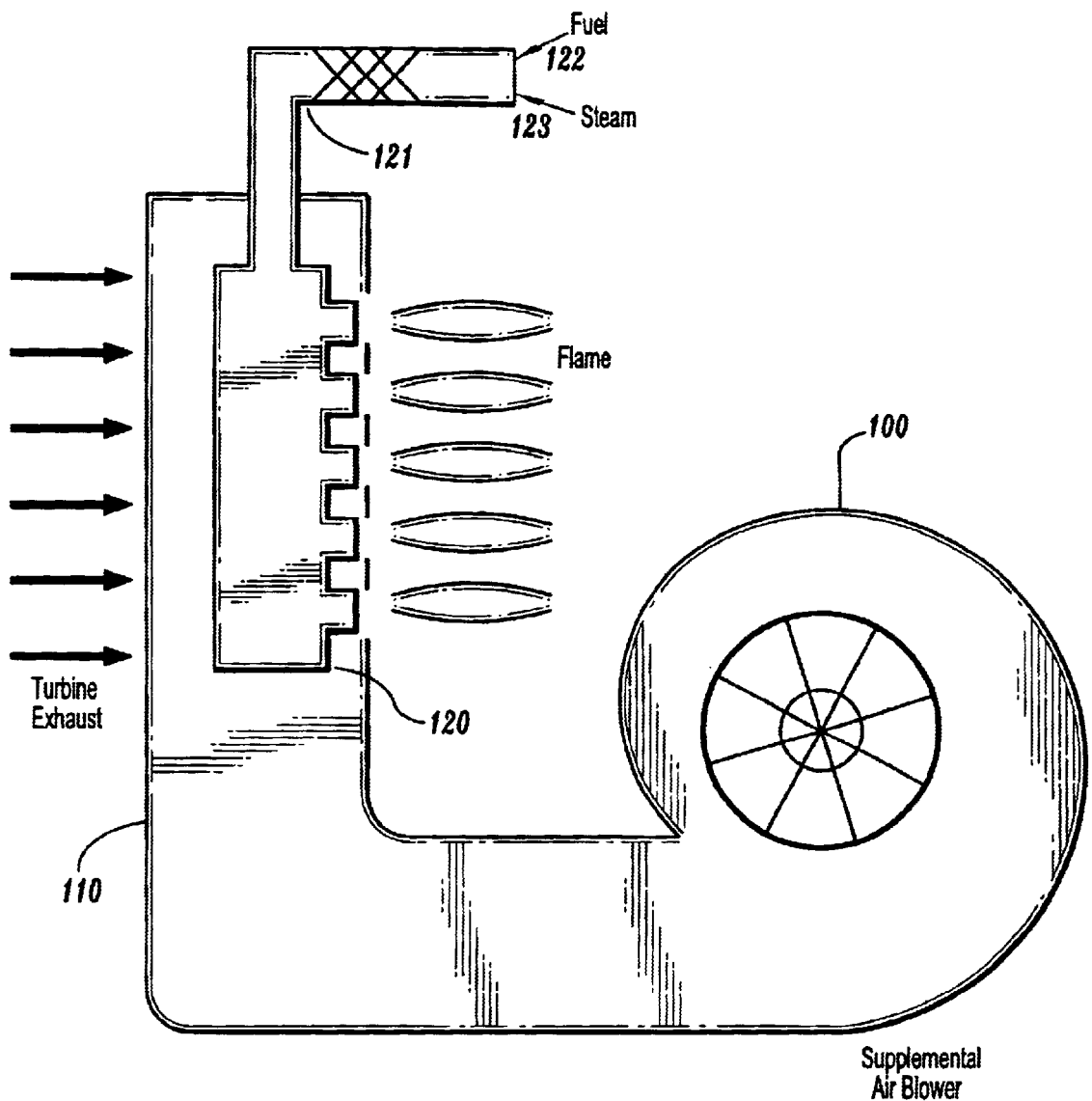
FIG. 5 is a typical illustration of an air-augmented, low-NOx duct burner used by an Advanced Cheng Combined Cycle embodiment.
Figure 6:
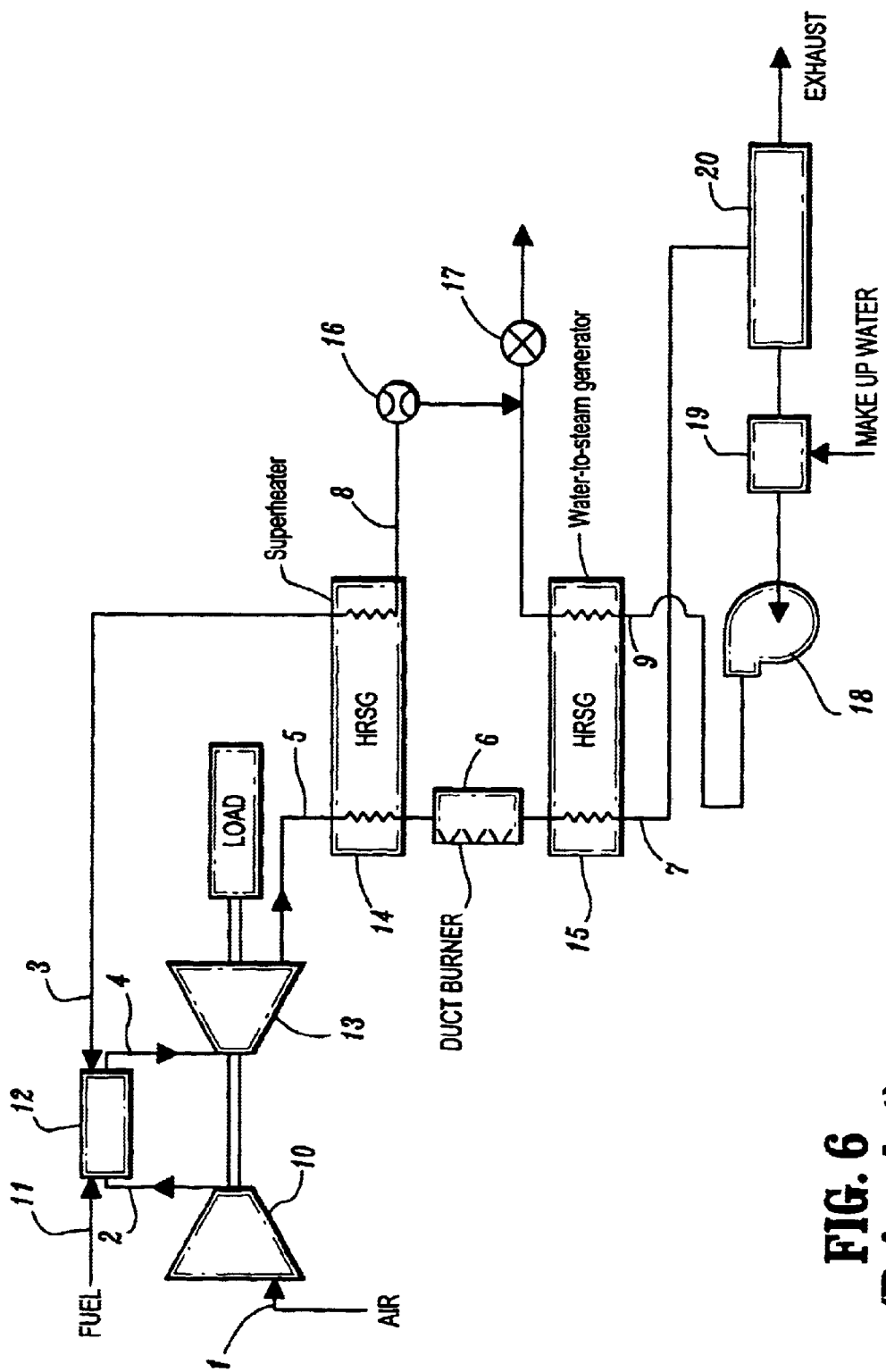
FIG. 6 illustrates components of the Cheng cycle.

FIG. 4 is a block diagram of an Advanced Cheng Combined Cycle embodiment. A gas turbine comprises a compressor 10, a combustion chamber 20, and a turbine 30. The power generated by the turbine 30 is fed through a shaft 31 to power the compressor 10 and is fed through another shaft 32 to power a generator 40. The compressor 10 increases the pressure of the air, and the compressed air discharged from there is fed through port 22 into the combustion chamber 20.

Combustion is a chemical reaction during which fuel is oxidized and a large quantity of energy is released. When combined with the fuel inputted into the combustion chamber at 26 and the steam injected at port 25, a mixture of air, combustion products, and high-temperature steam is created and is used to drive the turbine 30. The expanded hot gas stream coming from the turbine 30 is then usually discharged into an emission control device (e.g., a Selective Catalytic Reactor or SCR) and exits at 35 before entering a heat recovery steam generator (HRSG) 60.

A valve 68 controls the pressurized steam traveling from the heat recovery steam generator (HRSG) 60 into a steam turbine 70. Because the steam turbine 70 produces the power to drive a generator 41, the intermediate pressure can be extracted or bled from the steam turbine 70 as cooling steam for the gas turbine or as steam for injection into the combustion chamber 20 at port 27. A control valve 50 controls additional steam before it is injected into the combustion chamber 20. The control valve 50 doubles as a throttling valve which allows the highly-pressurized steam to be throttled to a relatively low pressure, then injected into the combustion chamber 20. The control valve 50 is usually a single drag valve such as those produced by Control Component, Inc.

A duct burner, added to the heat recovery steam generator (HRSG) 60 at 66, receives fuel and supplemental air through lines 61 and 62, respectively. A pump 69 feeds boiler quality water into the heat recovery steam generator or boiler through the emissions.

Therefore, as described above, the heat recovery steam generator or boiler generates steam for power augmentation for both the combined cycle and the Advanced Cheng Combined cycle. The combined cycle is typically exemplified by its high working pressure in a low steam temperature, however, the gas turbine component must follow the slow operating mode of steam turbine operations in order to prevent boiler upsets. Because the gas turbine does not provide any emission reductions on its own, mechanisms such as the Selective Catalytic Reactor (SCR) can be added to achieve this result. The Advanced Cheng Combined Cycle uses high temperatures and low-pressure steam to generate much more power, achieve greater efficiency levels, and produce more flexibility than a combined cycle. It also has inherent NOx reduction mechanisms, because the injected steam is used to lower the flame temperature. A duct burner is sometimes used with the Cheng Cycle or the Advanced Cheng Cycle to generate additional steam for industrial use, but it is not considered to be an economical practice for increasing the steam injection mass flow.

There are many modes in which the Advanced Cheng Combined Cycle can be operated. These modes were previously unavailable to either the combined cycle or the Cheng Cycle/Advanced Cheng Cycle. One mode involves operating the system with the full steam turbine capacity as a combined cycle, using the duct burner plus the additional mass flow from the gas turbine (a result of the steam injection) as the additional steam production. This mode provides the most flexible load following, as a system with a combined cycle capacity in addition to a peaking load following capability, without exceeding the gas turbine operating specifications. This is referred to as the Maximum Power Augmentation Mode.

Another mode of operation involves taking steam away from the steam turbine cycle for injection into the gas turbine. The exhaust from the additional steam of the gas turbine produces more steam than when in the combined cycle mode. Although this condition does not provide as much power as the previous mode, it produces a higher thermal efficiency than combined cycles.

The tradeoff of the exchange of steam from the steam turbine to the gas turbine determines the efficiency of the Advanced Cheng Combined Cycle. These two modes represent two extreme ends of the operations; the duct burner can certainly be added for cogeneration or as a trimming operation for the high efficiency mode. In general, the duct burner increases the power output, but decreases the thermal efficiency. Therefore, the tradeoff of taking steam from the steam turbine for steam injection is aimed at a no-duct burner operation.

The disclosed embodiment takes advantage of the high-pressure steam turbine for its efficient baseload work as well as the flexible load-following capabilities of the Cheng Cycle or the Advanced Cheng Cycle, which now functions as a load-following Advanced Cheng Combined Cycle. Because no additional components except a low-cost duct burner system need be added for additional power generation, the Advanced Cheng Combined Cycle's built-in mechanism for NOx reduction is extremely cost-effective in terms of cost per kilowatt. The combination of the aforementioned prior art cycles is superior to the output of the combined cycle and is more efficient than the Cheng Cycle or the Advanced Cheng Cycle working alone. The Advanced Cheng Combined Cycle also provides upgrade potential for both power and efficiency. A combined cycle currently operating in the field can use a retrofit process to modify its gas turbine into a steam-injected gas turbine to obtain additional power over the current combined cycle operation. Because the heat recovery steam generator (HRSG) already exists, this retrofit process is the simplest and most effective way to upgrade the efficiency potential of combined cycles.

The arrival of utility deregulation has prompted a further need for the Advanced Cheng Combined Cycle. Summer peak electrical prices can be as high as one hundred times the baseload electrical prices for a period of a few days. If secured, those few days can recover all the investment costs of the power plant for the rest of the year. Use of the Advanced Cheng Combined Cycle is the easiest and quickest way to capture this beneficial revenue.

The above specific embodiments are illustrative, and a person skilled in the art can introduce many variations on these embodiments without departing from the spirit of the disclosure or from the scope of the appended claims. The embodiments are presented for the purpose of illustration only and should not be read as limiting the claimed invention or its application. Therefore, the claims should be interpreted commensurate with the spirit and scope of the disclosure and its variations.

What is claimed is:

1. An Advanced Cheng Combined Cycle system, comprising:
 - a gas turbine, having a turbine generating power, a compressor receiving power from the turbine, and a combustion chamber to which is input compressed air from the compressor along with fuel for producing energy to drive the turbine, the gas turbine producing a hot stream gas;
 - a heat recovery steam generator receiving hot stream gas produced by the gas turbine and generating high-pressure steam therefrom;
 - a steam turbine receiving and being driven by high-pressure steam generated by the heat recovery steam generator;
 - a first conduit coupling the steam turbine and the gas turbine, said steam turbine bleeding steam through said first conduit for cooling the gas turbine;
 - a second conduit coupling the heat recovery steam generator and the combustion chamber and gas turbine to supply steam cooling to the combustion chamber and the gas turbine; and
 - a third conduit coupling the heat recovery steam generator and the combustion chamber and a control valve in said third conduit, throttling down high-pressure steam generated by the heat recovery steam generator to a low-pressure steam for injection back into the combustion chamber of the gas turbine.

* * * * *